Aug. 14, 1962    F. KESSLER    3,049,317
SPRING LOADED REEL
Filed March 15, 1957    4 Sheets-Sheet 1

INVENTOR
FRIEDRICH KESSLER

BY Otto John Munz
Attorney

Aug. 14, 1962  F. KESSLER  3,049,317
SPRING LOADED REEL
Filed March 15, 1957  4 Sheets-Sheet 2
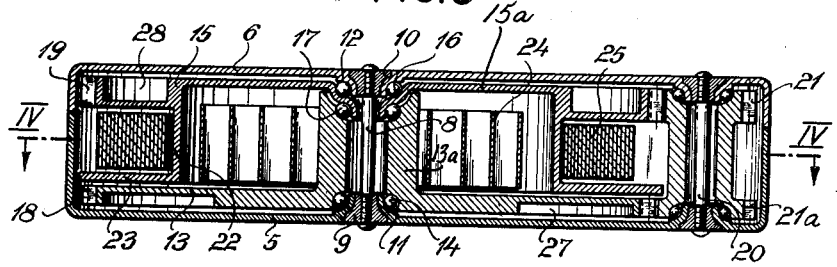
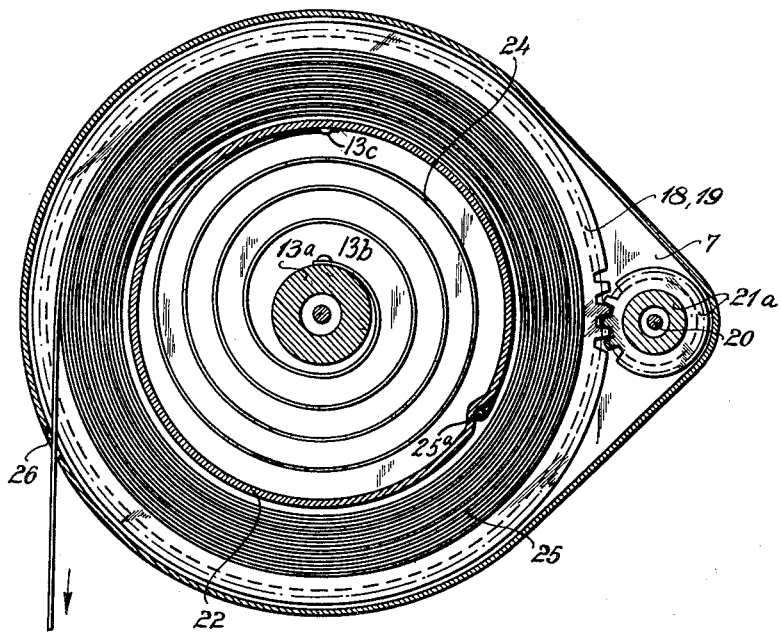
INVENTOR
FRIEDRICH KESSLER
By Otto John Munz
Attorney Aug. 14, 1962  F. KESSLER  3,049,317
SPRING LOADED REEL
Filed March 15, 1957  4 Sheets-Sheet 3

INVENTOR
FRIEDRICH KESSLER
BY Otto John Munz
Attorney

Aug. 14, 1962     F. KESSLER     3,049,317
SPRING LOADED REEL

Filed March 15, 1957     4 Sheets-Sheet 4

INVENTOR
FRIEDRICH KESSLER
BY Otto John Munz
Attorney

United States Patent Office 3,049,317
Patented Aug. 14, 1962

3,049,317
SPRING LOADED REEL
Friedrich Kessler, 16 Dorotheenstrasse,
Dusseldorf, Germany
Filed Mar. 15, 1957, Ser. No. 646,392
8 Claims. (Cl. 242—107.3)

The present invention pertains to a spring loaded self-compensating device having a flexible member and means to exert an opposing force upon extraction thereof from its housing to effect a rewinding of the member.

The device according to the invention can have many uses, e.g. it can be used for automatically rolling up measuring tapes, hoses, cables, roller blinds and the like.

According to the invention a spiral spring is arranged between two internally toothed annuli which have a different number of teeth, the spring being slowly tensioned or de-tensioned by means of the toothed annuli and a double pinion or a plurality of such double pinions having two different sets of teeth and engaging the toothed annuli. By an appropriate choice of transmission ratio for the gear wheels it is possible to select appropriate tensioning and detensioning moments for the spring. The transmission ratio of the toothed annuli with double pinions is preferably so chosen that the spring is tensioned and de-tensioned with the minimum possible amount of external force being necessary. If necessary, a plurality of springs can be provided in order to achieve the appropriate compensating tensioning. It is also possible by interchanging the gear wheels to provide different transmission ratios for meeting actual requirements. According to a further feature of the invention, where relatively great loads may occur the toothed annulus can also be provided with external teeth for engaging in a rack.

The flexible member for example, a tape measure, a band, a hose or the like, can expediently also be arranged in a U-shaped recess which extends in annular fashion about the drive mechanism of the device. The tape measure carrier can also be mounted by ball bearings on the device housing in order to facilitate movement of the said tape measure carrier.

The housing can expediently be of divided or multipart construction, for example divided into two halves along a central plane extending at right angles to the axis of the housing. It is also possible to arrange in or on the housing one or more devices which can be operated from the exterior for example by press buttons and whereby the incoming or outgoing band can be braked and arrested in any desired position.

In a practical construction it is possible to connect to each half of the housing a braking and arresting device, one of which may be used for braking and arresting the band or the drum while being retracted, whereas the other serves to brake and arrest the band while being extended. The means for braking the arresting devices can take the form of ratchet wheels and pawls.

Further details of the invention become apparent from the accompanying drawings wherein several constructional forms of the subject of the invention are illustrated by way of example.

FIGURE 3 is a sectional view, showing a second constructional form of the device utilizing external gearing to drive the band carrier.

FIGURE 4 is a sectional view taken on the line IV—IV of FIGURE 3.

Figure 1:
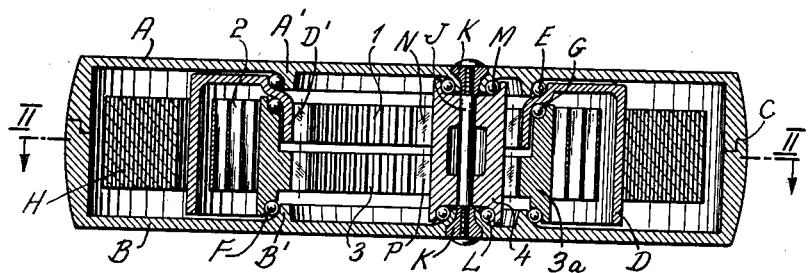
FIGURE 1 is a sectional view of one constructional form of the device according to the invention in which the rotatable drum-shaped band carrier is provided with internal teeth.
Figure 2:
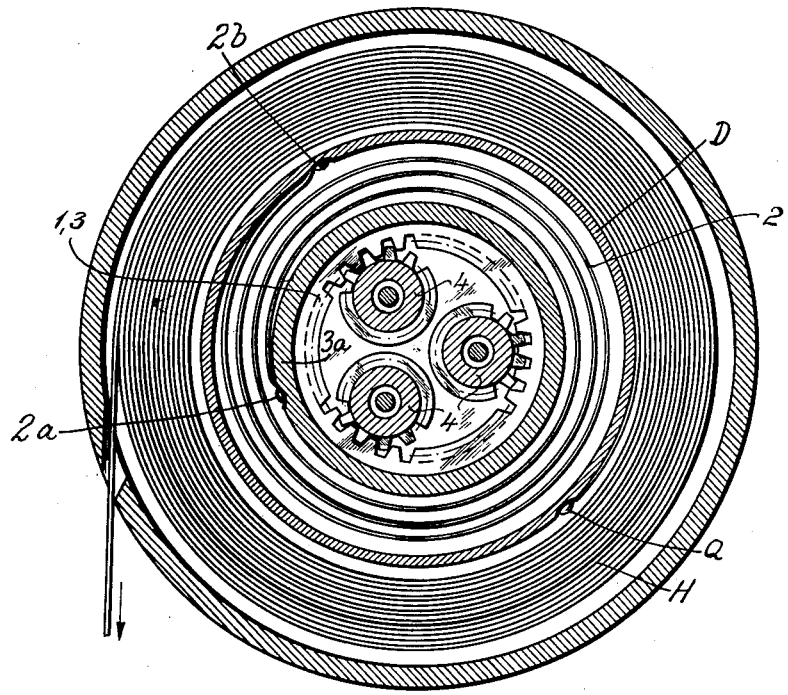
FIGURE 2 is a sectional view on the line II—II of FIGURE 1.

In the species of FIGURES 1 and 2, casing halves A and B are interconnected by a central half-lap joint C and have respective integral coaxial ball races $A^1$ and $B^1$ on their inner confronting surfaces. The tape reel D is in the general form of a hollow ring with a cross sectional shape which is clearly shown upon FIGURE 1, by which balls E are confined to race $A^1$ and coact in journaling the reel on a central axis of the casing. An internal ring gear 1 is fixed to and within a flange $D^1$ formed integrally with the reel. This gear may have, for example, forty teeth. A second internal gear 3 is mounted coaxially and in side-by-side relation with internal gear 1 and may have, for example, forty-one teeth. Gear 3 has a wide rim or hub 3a formed with internal ball races or channels at each edge. One race, the lower one as the parts are viewed upon FIGURE 1, cooperates with race $B^1$ to confine balls F, while the other coacts with a race formed by reel D, to confine balls G. Balls F and G thus conjointly journal gear 3 for rotation upon the same axis as gear 1 and also, in a manner clear from FIGURE 1, act to hold reel D in position journaled by and between balls E and G.

Three identical pinion sleeves 4 are journaled between the casing halves A and B, on respective axes which are equiangularly spaced about the aforesaid common axis of internal gears 1 and 3. Each of these sleeves has an axial length such that it spans both internal gears 1 and 3. FIGURE 1 shows the mounting of one of these sleeves, where it is noted that a shaft J has its ends fixed in and supported by casing halves A and B, as by nuts K threaded thereon. The casing halves are dished inwardly about the aperture through which the ends of the shaft extend, to define inner ball races which cooperate with the complementary outer races formed by the ends of the sleeve 4 to confine balls L and M and mount the sleeve 4 for free turning on an axis defined by its shaft. It will be understood that all sleeves 4 are identical and similarly mounted and journaled.

Each sleeve 4 has two sets of teeth fixed to or formed integrally with it. A first set of teeth N in mesh with internal gear 1 only, may, in the model illustrated be fifteen in number, while a second set P in mesh with the teeth of internal gear 3 only, may be sixteen in number.

A spiral leaf spring 2 is positioned within the annular space defined between reel D and rim or hub 3a. Referring to FIGURE 2, it is noted that one end of this spring is secured at 2a, as by riveting, to the external periphery or rim 3a, while its other end is similarly attached at 2b, to the inner surface of reel D. The tape H has its inner end secured at Q, FIGURE 2, to the outer periphery of reel D and is withdrawable through a slot R conjointly formed by the casing halves.

In operation, as the tape H is drawn out, each 360° rotation of reel D and gear 1, effects $^{40}/_{15}$ or $2\frac{2}{3}$ rotation of sleeves 4. Since teeth P are 16 in number while there are 41 teeth of gear 3, each $2\frac{2}{3}$ rotation of the sleeves, effects $^{16}/_{41} \times 2\frac{2}{3} \times 360 = 375°$ rotation of gear 3. That is gear 3 advances relatively to gear 1 by $(375-360)=15°$ for each 360° rotation of gear 1, and in 24 full rotations of reel H, gear 3 advances relatively to gear 1 by $24 \times 15 = 360°$ or one full rotation which, of course, tensions the spring by one turn. In order to reduce frictional losses and obtain a greater energy storage, spring 2 can be tapered in thickness from its inner end outwardly. For example, it can increase in thickness from 1 mm. at its inner or core end, to 2 mm. at its other end.

FIGURES 3 and 4 show a second embodiment of the invention including a casing comprising complementary lower and upper parts 5 and 6, respectively, secured together by shafts 8 and 20. As in the species of FIGURES 1 and 2, the casing parts are dished inwardly about the apertures through which central shaft 8 passes to form inner bearing races 11 and 12. The threaded ends of the shaft have nuts 9 and 10 fitting the external cavities thus formed to secure the two casing parts together and to present a smooth external surface for the casing.

The cross sectional form of reel 15 is clearly depicted at FIGURE 3 and presents a periphery 22 with axially-spaced flanges between which tape 25 is guided. The tape has its inner end secured to the reel at 25a. The reel has an integral web 15a centrally apertured and shaped to form an outer bearing race which, in cooperation with inner race 12, confines balls 16 and helps to journal the reel for smooth frictionless rotation. The reel has one flange, that is, the upper one as the parts are seen upon FIGURE 3, formed with gear teeth 19, in mesh with one set of teeth 21 of a pinion journaled by ball bearings on shaft 20. Since these bearings are conveniently formed in the way previously described for shaft J, and sleeve 4, FIGURE 1, it is deemed unnecessary to redescribe them.

Teeth 21a at the other end of the pinion mesh with a gear 13 having teeth 18 formed about its periphery, and a central hub 13a whose ends are shaped to form outer ball races. The lower race, as the parts are viewed upon FIGURE 3, cooperate with inner race 11 to confine balls 14. The upper race, cooperate with an inner race formed by the shaped central aperture of web 15a, to confine balls 17. The two sets of balls 14 and 17 thus journal hub 13a between them for smooth frictionless rotation. Balls 17 also assist in journaling reel 15 in a manner obvious from inspection of FIGURE 3.

Spiral spring 24 has its inner end attached to hub 13a at 13b and its outer end attached at 13c to the inner periphery 22 of reel 15. The number of teeth 18 differs from the number of teeth 19. Likewise the number of teeth 21 on the pinion differ from the number of teeth 21a. The ratios of the number of teeth of the several gears may be as described in connection with FIGURES 1 and 2, so that, for example, twenty-four rotations of reel 15 advance gear 13 relatively to it, by one full rotation and, of course, tensions spring 24 by one rotation. Of course, the ratios of the number of teeth may be varied widely to suit different sizes and lengths of tapes or other elongated flexible elements, as well as to suit different spring strengths and uses to which the invention is to be put. The tape is withdrawn through a slot 26 conjointly defined by the casing parts 5 and 6.

The gear 13 and reel 15 can be formed at their outer sides with recesses 27, 28 in which it is possible to arrange devices which if necessary can be operated from the exterior for example, by press buttons, and whereby the band or the like can be braked and arrested in any desired position when said band is travelling into or out of the housing.

The device which has been described can be modified and developed in many ways within the scope of the invention. Thus, for example, it would be possible to arrange the two gearwheels 13 and 15 close together and to mount the gearwheel 15 on the bushing or hub of the gearwheel 13. The spring 24 and the tape measure 25 or the like would then be arranged on the outer side of the gearwheel 15.

It is noted from FIGURE 3 that web 15a is positioned at one end of hub 13a so that an annular space is formed between reel rim 22 and hub 13a, within which spring 24 is accommodated. This makes an extremely compact arrangement making it possible to produce, for example, tape measures of very small dimensions which correspond approximately to the size of a pocket watch and which allow automatic return of the tape. For other uses, for example for roller blinds and the like, the construction of the device according to the invention provides correspondingly more room for accommodating the roller blind band and the like.

Figure 5:
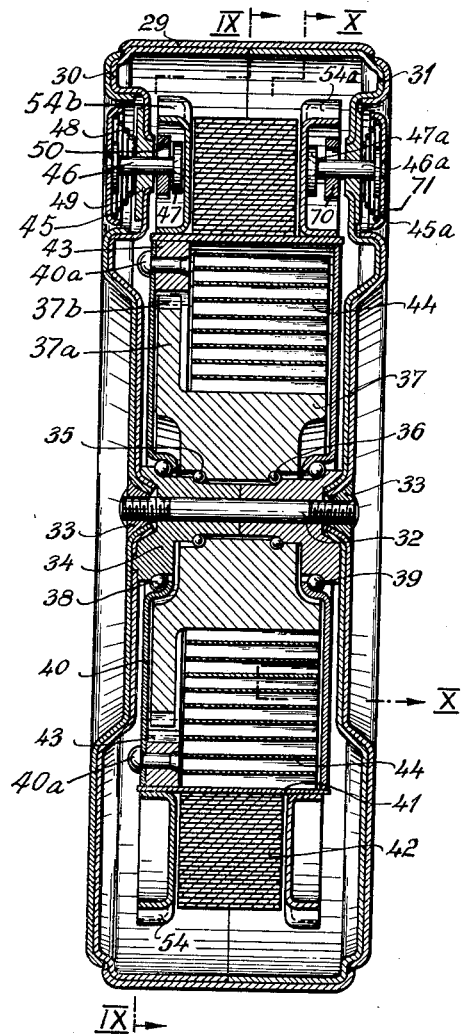
FIGURE 5 shows a further constructional form of the device according to the invention, taken in section along the line V—V of FIGURE 9.
Figure 7:
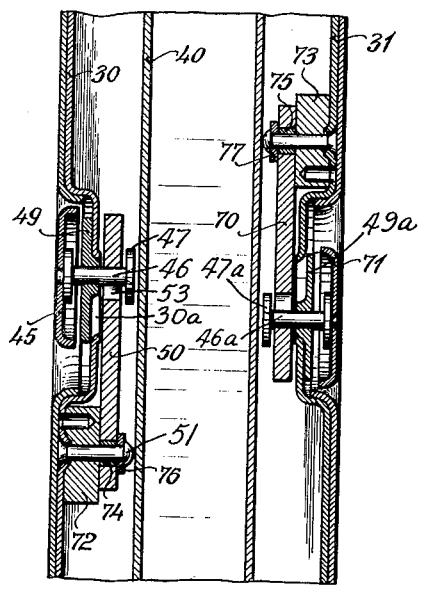
FIGURE 7 is a sectional detail view taken on the line VII—VII of FIGURE 9 showing the braking and arresting devices.
Figure 8:
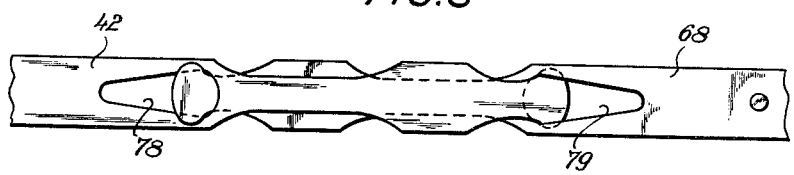
FIGURE 8 is a detail view showing the manner in which the inner end of the tape is releasably connected with a short flexible connector.
Figure 9:
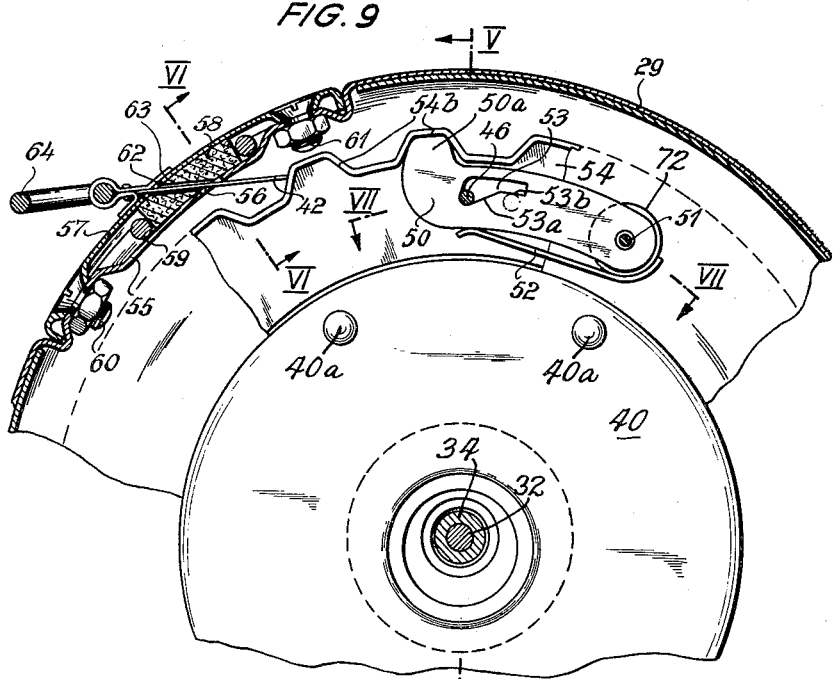
FIGURE 9 is a partial sectional view taken on the line IX—IX of FIGURE 5.

According to FIGURES 5 to 10, the reference numeral 29 designates the retaining band which is made of metal or synthetic plastic material and which tightly surrounds and interconnects the two housing halves 30 and 31. Formed somewhat eccentrically to the axis of symmetry of the two housing halves, which are expediently of identical construction, are holes through which extends a pin 32 having threaded ends and which is secured in position by means of nuts 33 threaded upon its externally projecting ends. An eccentric bearing member 34 is held by the beaded-over edges of the holes in the housing halves and by the pin 32 in a manner clear from inspection of FIGURE 5. Ball races or ball bearings 35, 36 are used for supporting the externally toothed spring core gear wheel 37. Ball bearings 38, 39 are the bearings for the tape measure spool 40. This spool comprises a pair of like, circular, axially-spaced discs, having apertures at their centers, the edges of which are pressed inwardly to form outer races for balls 38, 39. A cylindrical band or spool core 41 extends about and integrally connects and spaces, the peripheries of the two discs. A pair of identical ring-like brake or ratchet members 54 and 54a have smooth main circular peripheries which fit closely about and are secured in any suitable manner, as by press-fitting, spot-welding, riveting, etc., to and about the respective side edges of band 41. Referring to FIGS. 5 and 9, it is noted that these ratchet members are axially spaced to accommodate tape 42 loosely between them and are generally U-shaped in radial section. The radially-inward surface of members 54 and 54a is cylindrical while the radially outward part is formed with a plurality of equally-spaced radially-outwardly-extending projections or recesses 54b, within which may fit the nose of a pawl member 50, subsequently described in detail. An internal ring gear 43 is fixed, as by rivets 40a, to the inside peripheral area of one wall of reel 40 and coaxial of the axis of rotation thereof. Spiral winding spring 44 is positioned within the annular space between the hub of wheel 37 and the rim 41 of reel 40 and, as clearly shown upon FIG. 10, has its inner end attached to the hub portion of wheel 37 as at 44a, and its outer end 65 attached to the inner surface of rim 41 of spool 40 by means subsequently described.

Hub 37 has a gear 37a fixed with its left end, as the parts are viewed upon FIG. 5, and in mesh with gear 43.

It is noted from FIG. 5 that balls 38 and 39, shown uppermost in this figure, are at a materially less radial distance from pin 32 than are the corresponding balls shown in lowermost position. This means that the axis of rotation of reel 40 is below pin 32, as the parts are viewed upon the figure mentioned. On the other hand, the axis of rotation of wheel 37 is coincident with that of pin 32. As shown, the eccentricity between the axes of the spool and wheel is such that the teeth of ring gear 43 and wheel flange 37a mesh at the top, in the plane of FIG. 5. Since teeth 37b are fewer in number than those of gear 43, each 360° rotation of reel 40 effects rotation of hub 37 relatively thereto, by 360° plus an additional angle subtended by a number of teeth equal to the difference between those on gear 43 and those of gear 37a. Hence for each full rotation of reel or spool 40, spring 44 is tensioned by the aforesaid additional angle which, as stated, will depend upon the difference in the number of teeth on ring gear 43 and those of gear 37a.

FIGURES 5, 7 and 9 depict the braking and locking devices embodied in the model under description. Brake rings or members 54 and 54a have been previously described as U-shaped in a radial axial plane and it will be noted that each faces outwardly.

Referring, first, to the combined brake and lock shown at the upper left of FIG. 5 and at the left on FIG. 7, a press-button 45 is mounted with a depression formed in the casing wall and is fixed to the outer end of an axially movable pin 46 whose inner end has a brake disc 47 fixed thereto and in position to engage the flat inner bottom of brake ring 54. A spiral coil spring 48 acts between the casing and button 45 to urge the disc 47 out of braking contact with member 54. But when the button is manually pressed inwardly disc 47 engages member 54 and acts, in an obvious manner, to brake reel 40.

Referring to FIG. 7, pin 46 is axially slidably mounted in a slide 49 which is, in turn, mounted for limited movement in and along a slot 30a extending circumferentially of the casing half 30. A pawl 50, best shown at FIG. 9, is pivoted at one end upon a bushing 74 carried by a pivot 51 and is maintained in its proper plane of position by a spacer 72 between the casing and pawl and by a washer 76.

The other end of the pawl is formed with a nose 50a engageable within any one of the recesses 54b. As clearly shown upon FIG. 9, pawl 50 has a generally triangular opening 53 defining a cam edge 53a and a dwell 53b. Pin 46 passes through this opening, and the parts are so arranged and proportioned that when button 45 is moved circumferentially, with slide 49, in a clockwise direction as viewed upon FIG. 9, pin 46 rides on edge 53a and cams the pawl radially inwardly about its pivot 51, against the urge of a leaf spring 52, fixed at one end to spacer block 72 and at its other end engaging the pawl to continuously urge its nose 50a, radially outwardly. When pin 46 rides into position in dwell 53b, the pawl is thereby releasably held in retracted position.

Thus the parts just described form a combined brake and lock assembly. Button 45 may be pressed inwardly in any position of circumferential adjustment thereof. But when the parts are in the position shown upon FIG. 9, nose 50a engages in a recess 54b and, in an obvious manner, locks the reel or drum against rotation. Conversely, when the button 45 and slide 49 are circumferentially slid to the other limiting position, the pawl is held in release position.

A second combined spool or reel brake and lock assembly is shown upon FIGS. 5 and 7. Since this assembly is an allochiral duplicate of the one just described in the preceding paragraphs, it is sufficient to identify press button 71, slide 49a, pin 46a, brake disc 47a, pawl 70, spacer block 73, bushing 75, and washer 77. It will be understood that the nose of pawl 70 corresponds to nose 50a of pawl 50 and is adapted to fit any of the recesses of ratchet ring or member 54a. Likewise its aperture is shaped like aperture 53 of pawl 50 and has a corresponding function. The only difference is that, referring to FIG. 7, button 45 is moved downwardly to release pawl 50 from brake ring 54, while button 71 is moved upwardly, both as the parts are viewed upon this figure.

While, for clarity and simplicity of illustration, FIG. 5 shows pins 46 and 46a in a common plane, in the preferred arrangement, these are positioned slightly spaced circumferentially of the case, as illustrated at FIG. 7. Furthermore, reference to FIG. 9 shows that both of the previously-described brake-and-lock assemblies are located near and a short distance behind the tape or cord outlet. By this arrangement a very convenient control of the spool 40 is afforded. A user may grasp the case in the palm of his right hand, for example, with the thumb thereof on button 45 and the forefinger extending over the periphery of the case and engaging button 45a. When the tape, cord or line is being payed out and is to be stopped and locked, pressure of the thumb and forefinger upon the respective buttons, moves both discs 47 and 47a into braking contact with the respective rings 54 and 54a and effectively slows and stops the reel. Then, if it is to be locked in that position, a slight circumferential shift of the buttons in opposite directions, that is, a slight upward shift of button 45 by the thumb and a corresponding downward shift of button 71 by the forefinger, as the parts are viewed upon FIG. 7, locks the spool 40 against further rotation. Unlocking is as easily effected and may be accompanied by a braking action merely by pressure upon the buttons.

Of course, the invention may be used with only one of the aforedescribed brake-and-lock assemblies, but the two together cooperate to afford a convenient powerful control wherein an operator can, with one hand, hold the case and brake and lock the reel therein, at will. In an obvious way, too, the simultaneous use of both buttons for braking reduces movement forces upon the anti-friction bearings.

FIGURE 9 shows that a portion 55 of the retaining band 29 is pressed inwards and is formed with a slit 56 through which the tape measure 42 travels. The two housing halves 30 and 31 are thereby secured against rotation and displacement relative to one another. At the same time the arrangement of the covering plate 57 which is flush with the rest of the periphery of the retaining band, provides the space in which strips of felt 58 are accommodated, which strips are so compressed by a surrounding spring 59 that they remove any dirt adhering to the tape measure. The dirt removing device, which can also be made of other materials, for example foamed rubber or the like, can be cleaned or interchanged by arranging for the covering plate to be releasably connected to the corresponding part of the retaining band by screws 60, 61. The covering plate 57 is also formed with a slot 62 which, when the tape measure is wound up, is covered by a covering plate 63 fixed with the end of the tape, whereby the penetration of dirt and excessive pressure on the covering plate when the end of the tape measure impinges thereon are prevented. A holding ring 64 is attached to the end of the tape so that it can be easily handled.

Figure 10:
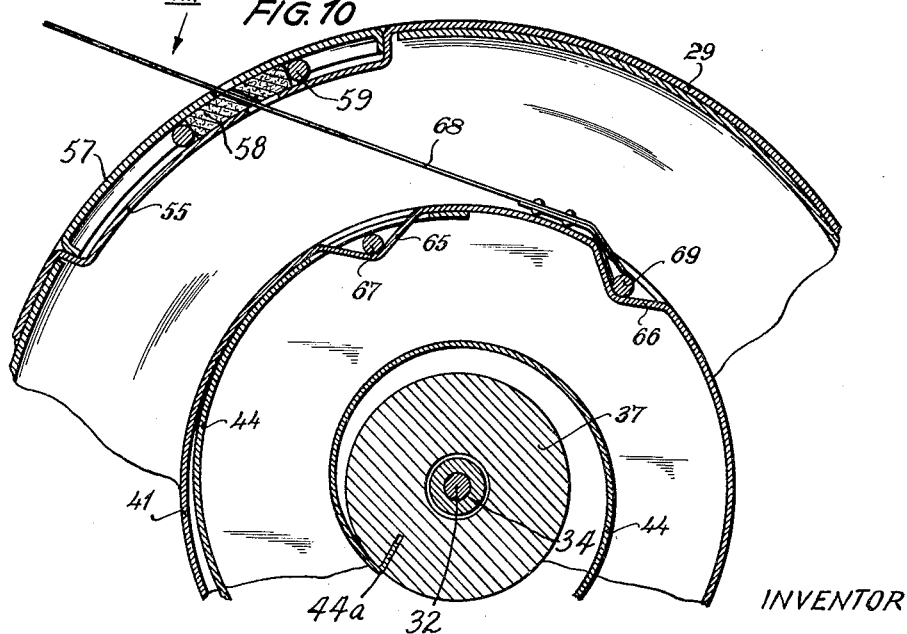
FIGURE 10 is a partial sectional view taken on the line X—X of FIGURE 5.

FIGURE 10 illustrates the securing of the winding spring 44 to the spring core gear wheel 37 and to the spool core 41. The spool core 41 comprises two lugs 65, 66, whereof the lug 65 is used for fastening the outer end of the spring by means of a pin 67, and the lug 66 is provided for fastening the connecting piece 68 of the tape measure by means of the pin 69.

Figure 6:
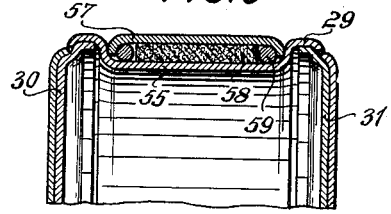
FIGURE 6 is a sectional detail view taken on the line VI—VI of FIGURE 9 showing the arrangement of the felt tape-cleaning strip between the support ring and the covering plate.

FIGURE 6 illustrates in cross-section the provision of the retaining band 29 with its portion 55 in the region of the housing parts in which the latter are cut away in order to form the recess for the tape cleaning element 58. This figure shows that in this part of the band also a complete seal is provided in order to make it impossible for dirt to penetrate.

FIGURE 8 shows the manner in which the tape measure 42 and the connecting piece 68 are detachably connected to one another. Both the tape measure and the connecting piece are provided with generally triangular openings 78 and 79 into which the appropriately fashioned ends of the tape measure and of the connecting piece can be inserted reciprocally.

Besides the dust-proof and dirt-proof mounting of the tape measure carrier proposed according to the invention, the shifting of the ball bearings towards the interior substantially reduces the losses due to friction and the weight of the device. The same advantages are also achieved by the aforementioned shape of the spring, which also makes it unnecessary to machine the spring specially. The arrangement of the braking and arresting devices contributes to reducing stress on the tape measure and to making the latter easy to handle as previously described.

The invention is not limited to a device constructed as a tape measure, but is equally applicable to roller blinds, hoisting apparatus, cable drums and the like. The spring fashioned according to the invention is also not limited to a tape measure, since it could also be used expediently with spring mechanisms of all kinds, for example time pieces or the like.

I claim:

1. In a winding and reeling device, a casing having opposed spaced side walls, a shaft fixed at its ends to and extending between said side walls and defining a first axis, a hub journaled on said shaft for rotation on said first axis, a first gear fixed with said hub coaxially about said first axis, a reel journaled in said casing for rotation on a second axis parallel with and offset from said first axis, an internal gear fixed with said reel coaxially of said second axis and in mesh with said first gear, there being an annular space defined by and between said hub and the periphery of said reel, a spiral spring within said space and having its ends attached to said hub and said reel, respectively, and a flexible elongated member wound exteriorly about said reel and having one end attached thereto and withdrawable from said casing.

2. In a winding and reeling device, a casing, a reel and a spring-winding hub independently journaled in said casing on discrete parallel axes, and defining an annular space between them, a spiral winding spring in said annular space and having its convolutions extending about both said axes and its ends secured to said reel and hub, respectively, an elongated flexible element wound on said reel and having one end connected therewith and withdrawable from said casing, and gearing positively interconnecting said reel and hub for simultaneous rotation in the same direction, said gearing angularly advancing said hub relatively to said reel in the direction of rotation effected by withdrawal of said flexible element, by a fixed fraction of a rotation for each full 360° rotation of said reel, to thereby stress said spring.

3. A winding and reeling device comprising a casing, a hub journaled in said casing for rotation on a first axis, a first gear fixed with said hub coaxially of said first axis, a reel journaled in said casing for rotation on a second axis parallel with and offset from said first axis, an internal gear fixed with said reel coaxially of said second axis, in the plane of, and meshing with said first gear, said hub and reel defining an annular space therebetween, a spiral spring positioned in said annular space and extending about both said axes and having its ends connected with said hub and said reel, respectively, and an elongated flexible element wound externally about said reel for withdrawal from said casing and having one end connected with said reel.

4. A winding and reeling device comprising a casing, a hub journaled in said casing for rotation on a first axis and having a first gear fixed therewith, a reel journaled in said casing to extend about and encompass said hub and journaled in said casing for rotation about said hub, on a second axis parallel with and offset from said first axis, a second gear fixed with said reel coaxially of said second axis and in mesh with said first gear, the difference between the number of teeth of said gears being a small integer, said hub and reel defining an annular space therebetween, a spiral spring positioned in said space and having its ends connected with said hub and said reel, respectively, and an elongated flexible member having one end connected with said reel and withdrawable from said casing.

5. A winding and reeling device as in claim 4, said casing comprising spaced side walls, a shaft having its ends fixed in said walls, respectively, bushing means fitting about said shaft and defining first bearing means coaxial of said first axis, said bushing means also defining second bearing means coaxial of said second axis, said hub being journaled on and by said first bearing means, said reel being journaled on and by said second bearing means.

6. In a winding and reeling device, a casing, a hub journaled in said casing for rotation on a first axis, a first gear fixed with said hub coaxial of said first axis, a reel journaled in said casing for rotation on a second axis parallel with and radially offset from said first axis, an internal gear fixed with said reel coaxially of said second axis and meshing with said first gear, a spiral spring having its ends fixed with said hub and said reel respectively, a brake ring fixed with the periphery of said reel and presenting a flat annular braking surface in a plane normal to said axes, a brake member including a pin mounted in said casing for axial movement toward and from said braking surface, means carried by said casing for manually moving said pin, and means carried by said pin for movement into braking contact with said surface.

7. In a winding and reeling device, a casing, a hub journaled in said casing for rotation on a first axis, a first gear fixed with said hub coaxial of said first axis, a reel journaled in said casing about said hub, for rotation on a second axis parallel with and radially offset from said first axis, a second gear fixed with said reel coaxial of said second axis and in mesh with said first gear, there being an annular space between said hub and reel, a spiral spring in said annular space and having its ends secured to said hub and reel, respectively, a braking ring U-shaped in cross section and fixed peripherally about said reel, the outer wall of said ring having a plurality of circumferentially-spaced recesses, said ring presenting an annular plane braking area normal to said axes, a pawl pivoted at one end to said casing and having a portion adapted to enter any one of said recesses to secure said reel against rotation, brake means adapted to be moved into and out of contact with the braking area of said ring, and a single device carried by said casing and movable in a first direction to move said braking means into braking contact with said area and in a second direction to engage said pawl and effect movement thereof into and out of an adjacent one of said recesses, and a flexible elongated member wound exteriorly about said reel and having one end secured thereto and withdrawable from said casing.

8. In a winding and reeling device, a casing having generally parallel, spaced side walls, a hub journaled in said casing between said walls for rotation on a first axis, a first external gear fixed with said hub coaxial of said axis, a reel journaled in said casing between said walls for rotation on a second axis parallel with and radially offset from said first axis, said hub and reel defining an annular space between them, an internal gear fixed with said reel coaxially of said second axis and in mesh with said first gear, a spiral spring mounted in said annular space and having its ends secured to said hub and said reel, respectively, first and second axially-spaced brake rings secured about and outstanding from the periphery of said reel to define an annular channel with said reel, a tape wound about said reel within said annular channel and having one end attached to said reel, and withdrawable from said casing, first and second press buttons carried by said walls respectively, in substantially axially-aligned positions, and first and second brake means each operated by pressure on a respective button to engage a corresponding brake ring, thereby to brake said reel.

References Cited in the file of this patent

UNITED STATES PATENTS

| | | |
|---|---|---|
| 198,179 | Anderson | Dec. 18, 1877 |
| 583,830 | Wiley | June 1, 1897 |
| 1,941,880 | Earll | Jan. 2, 1934 |
| 1,944,264 | Oravec et al. | Jan. 23, 1934 |
| 2,136,072 | Bush | Nov. 8, 1938 |
| 2,151,130 | Mattsson et al. | Mar. 21, 1939 |
| 2,505,920 | Sporket | May 2, 1950 |
| 2,609,192 | Lermont | Sept. 2, 1952 |
| 2,845,233 | Pfankuch et al. | July 29, 1958 |